United States Patent [19]
Herrmann et al.

[11] Patent Number: 5,146,628
[45] Date of Patent: Sep. 15, 1992

[54] SLIP-RESISTANT PROTECTIVE GLOVE AND METHOD FOR MANUFACTURING SLIP-RESISTANT GLOVE

[75] Inventors: Raymond J. Herrmann, Westlake; Keith A. Furgalus, Rocky River, both of Ohio

[73] Assignee: Bettcher Industries, Inc., Birmingham, Ohio

[21] Appl. No.: 604,589

[22] Filed: Oct. 26, 1990

[51] Int. Cl.$^5$ .............................. A41D 19/00
[52] U.S. Cl. ........................ 2/161 R; 2/167; 2/169
[58] Field of Search ............... 2/159, 161 R, 167, 168, 2/169, 163, 158, 161 A

[56] References Cited

U.S. PATENT DOCUMENTS

| | | | |
|---|---|---|---|
| 3,607,822 | 9/1971 | Nishino | 260/37 |
| 3,700,515 | 10/1972 | Terry | 156/72 |
| 3,821,067 | 6/1974 | Taylor et al. | 161/67 |
| 3,895,149 | 7/1975 | Sheffler et al. | 428/94 |
| 3,923,926 | 12/1975 | Harada et al. | 260/77.5 |
| 4,267,044 | 5/1981 | Kroplinski et al. | 210/321.2 |
| 4,470,251 | 9/1984 | Bettcher | 2/167 X |
| 4,493,865 | 1/1985 | Kuhlmann et al. | 2/ |
| 4,526,828 | 7/1985 | Fogt et al. | 428/229 |
| 4,640,950 | 2/1987 | Nishino et al. | 524/265 |
| 4,810,559 | 3/1989 | Fortier et al. | 2/161 R X |
| 4,912,781 | 4/1990 | Robins et al. | 2/167 |
| 4,936,085 | 6/1990 | Kolmes et al. | 57/229 |

FOREIGN PATENT DOCUMENTS

| | | |
|---|---|---|
| 2441763 | 3/1976 | Fed. Rep. of Germany . |
| 1367488 | 6/1964 | France . |
| 2458237 | 2/1981 | France .............. 2/161 R |
| 0003492 | 2/1979 | Japan .................. 2/169 |
| 0151304 | 8/1985 | Japan .............. 2/161 R |
| 1321902 | 12/1989 | Japan .................. 2/167 |
| 2181691 | 4/1987 | United Kingdom . |

OTHER PUBLICATIONS

Form 789, The Whizard Cut-Resistant Liner II Glove, 1989.
Form 900-4, The Whizard Knife Handler Glove, 1990.
Bulletin GG585, The Whizard Gripguard Glove, 1985.
European Search Report, Application No. 91 11 8090, dated Jan. 28, 1992.

*Primary Examiner*—Werner H. Schroeder
*Assistant Examiner*—Sara M. Current
*Attorney, Agent, or Firm*—Watts Hoffmann Fisher & Heinke

[57] ABSTRACT

A glove having patterned polyurethane coating adhered to outer surface. The coating is about 1/32 inch high and about 1/16 inch wide to give the glove slip-resistant and gripping properties. The coating is formed from (a) a pre-mixed thixotropic component, a non-thixotropic component in a 2.5 to 1 ratio, and an accelerator, and (b) a cross-linking agent. The method of manufacturing the glove involves applying a mixture of (a) and (b) as a strip to the glove, allowing the strip of coating to wet the fibers and then curing at a low temperature for a relatively short period of time.

26 Claims, 2 Drawing Sheets

SLIP-RESISTANT PROTECTIVE GLOVE AND METHOD FOR MANUFACTURING SLIP-RESISTANT GLOVE

DISCLOSURE OF THE INVENTION

This invention relates to a slip-resistant protective glove having a polyurethane coating patterned thereon and a method of manufacturing the glove.

BACKGROUND OF THE INVENTION

In certain industries, e.g. the glass industry and industries that fabricate or utilize sheet metal, workers must work with materials having sharp edges. The workers wear cut-resistant, gloves to protect their hands against injury.

Cloth gloves, in particular, and even leather gloves do not provide as good gripping characteristics as desired because the glove surface is not especially slip-resistant. They are also not as cut resistant as desired. Highly cut resistant gloves made of yarn having steel strands, synthetic fibers, often high strength synthetic fibers, are available but for some industrial uses they are not as slip-resistant as desired. Attempts to improve such gloves have involved the use of polyvinylchloride (PVC) dots adhered to the glove surface. The PVC did not wet the yarn effectively, requiring that the dots be wide to provide greater surface area for adherence to the fibers. These dots required high temperatures to apply and cure, which were not compatible with some synthetic fibers used in glove substrates, and the dots were not sufficiently slip-resistant, abrasion resistant and flexible to assure optimum performance. In addition, they were relatively thick so that it was primarily only the dots rather than the dots and the supporting fabric between the dots that would contact a surface being gripped, resulting in a lack of feel by the wearer and a diminishing of the surface area in contact with the object being gripped, which diminished the potential gripping ability.

SUMMARY OF INVENTION

The present invention provides a glove with an improved slip-resistant polyurethane coating. The coating is applied as a bead to the glove in a pattern, the bead being approximately 1/32 inch high and approximately 1/16 inch wide. This height and width allow the wearer of the glove to grip an object with the underlying glove as well as with the bead rather than have the object contact merely the bead. At the same time, the height of the bead and the areas provided are sufficient to provide the desired high slip-resistant property.

The coating itself is abrasion resistant, cut-resistant, flexible, soft and does not require a processing temperature that will melt or degrade some of the synthetic fibers used in glove fabrication. The coating is a polyurethane mixture comprised of both thixotropic and non-thixotropic resins. When applied to the glove, the resin mixture wets the yarn, which increases the bonding of the coating with the glove. The thixotropic resin retains its dimensional stability upon application to a glove, i.e., slumping is resisted, so that a desirable height and width of coating can be obtained. The height and width of the coating and the fact that it is a polyurethane coating of thixotropic and non-thixotropic resins give the glove both the desired slip-resistance and gripping properties.

Thus the present invention provides a glove having a patterned slip-resistant polyurethane coating adhered to an outer surface. The coating has a substantial height and a substantial width and is slip-resistant, thereby providing good grip properties. The coating comprises a cured polyurethane composition formed from (a) a pre-mixed thixotropic component, a non-thixotropic component and an accelerator and (b) a cross-linking agent. The coating in part permeates the glove surface for adhesion while essentially retaining dimensional stability.

The invention further provides a method of manufacturing a glove having a patterned slip-resistant polyurethane coating adhered to an outer surface of the glove. The steps include selecting a glove; providing a pre-mixed composition of a thixotropic polyurethane component, a non-thixotropic polyurethane component and an accelerator; providing a cross-linking agent for the polyurethane components; mixing the composition and agent; flowing a stream of the mixture onto a surface of the glove in a controlled pattern and thereby forming localized raised portions on the surface of the glove; and curing the mixture to form a glove having a patterned coating adhered to the glove.

The various features and advantages of the invention will become more apparent from the detailed description of a preferred embodiment of the invention when considered along with the accompanying drawings.

BEST MODE FOR CARRYING OUT THE INVENTION

Figure 1:
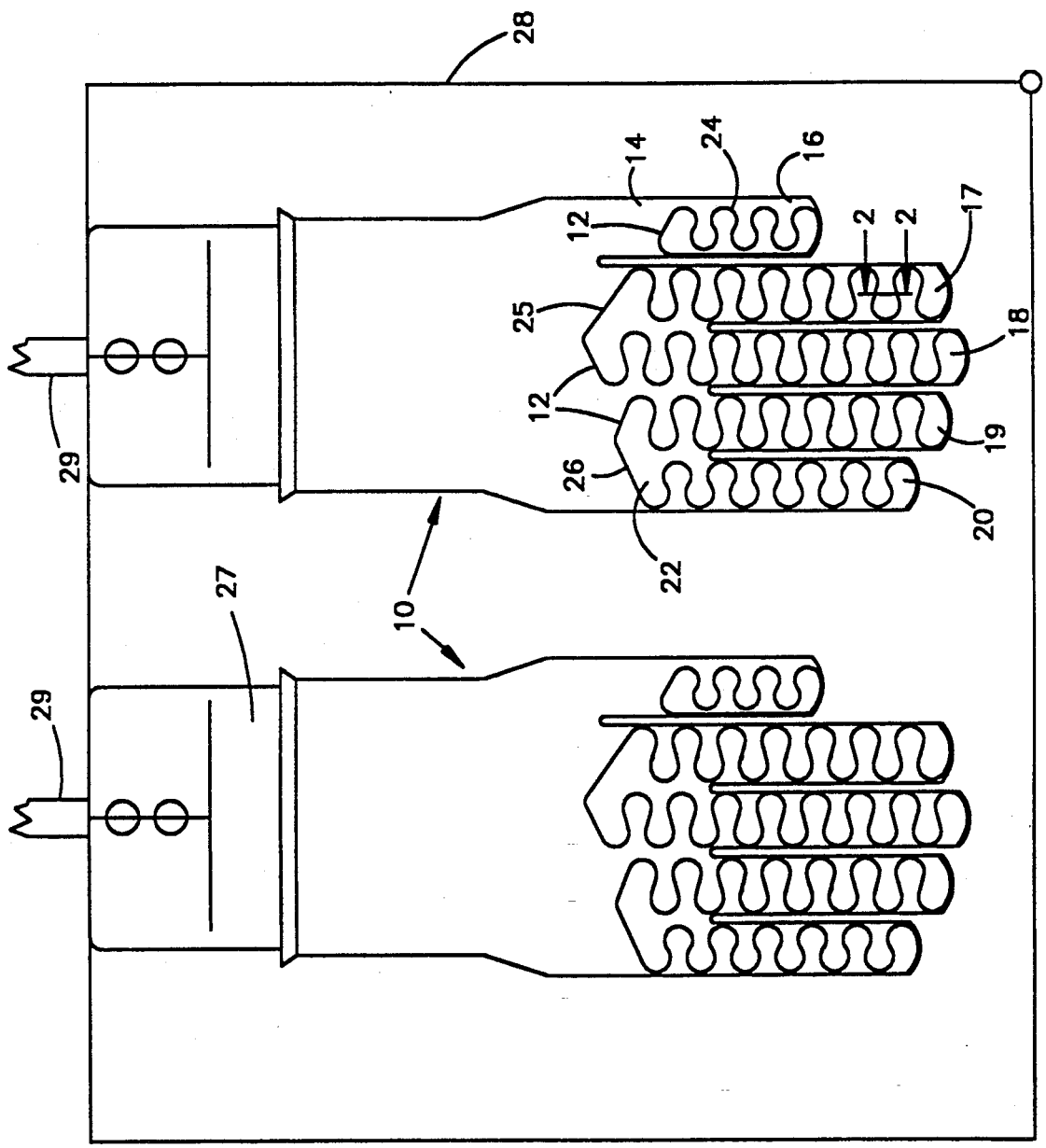
FIG. 1 is a top plan view of two gloves on forms each having a polyurethane coating patterned thereon.
Figure 2:
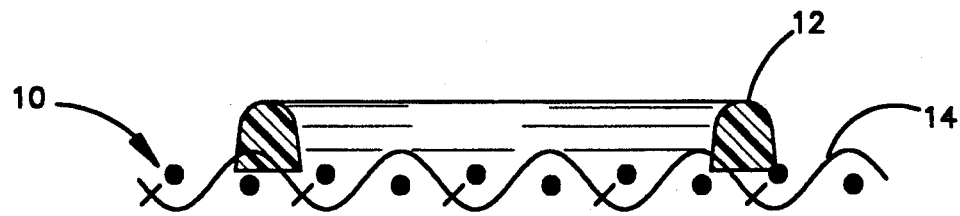
FIG. 2 is an enlarged, fragmentary sectional view, one of the gloves of FIG. 1 taken along the line 2—2, showing the adhered coating.
Figure 3:
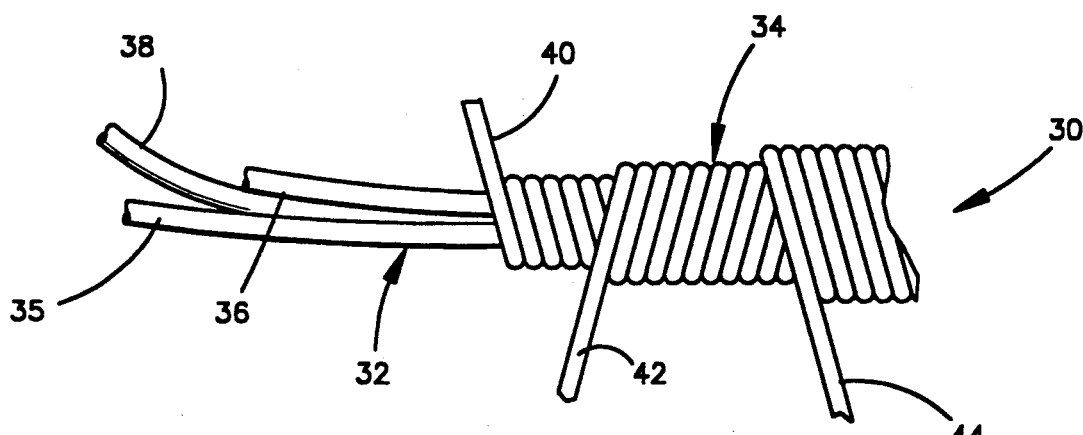
FIG. 3 is a fragmentary, diagrammatic view of a cut-resistant yarn of which a glove embodying the present invention is knit; and, FIG. 4 is a fragmentary, diagrammatic view of a second cut-resistant yarn of which a glove embodying the present invention is knit.
Figure 4:
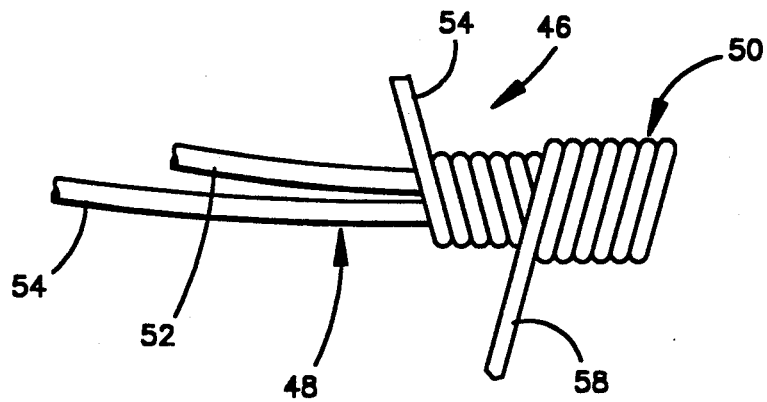

A glove 10 embodying the invention is shown having a polyurethane patterned coating 12 on the outer surface 14. The coating 12 is a mixture of thixotropic and non-thixotropic resins and is applied directly to the glove surface by an applicator moved relative to the glove surface. The design of a desired pattern can be programmed into the applicator to control its movement. Upon application of the mixture of the thixotropic and non-thixotropic resins to the outer surface of the glove an initial time period is utilized at ambient temperature in which a part of the mixture wets the surface of the glove. During a subsequent time period the mixture is cured by applying heat. The mixture cures into a flexible, slip-resistant, patterned polyurethane coating that is securely adhered to the glove.

The coating 12 is formed in the applicator from a mixture of a thixotropic component, a non-thixotropic component, an accelerator and a cross-linking agent. A pre-mixed concentrate of a thixotropic component and a non-thixotropic component, mixed in a ratio of between about 3 to 1 and 2 to 1, preferably 2.5 to 1, is prepared and stored. It has been found that this proportion of thixotropic component to non-thixotropic component provides an advantageous mixture for application to the glove to give the desired properties of dimensional stability prior to curing and flexibility and adhesion to the glove after curing. The thixotropic and non-thixotropic components are both a hydroxyl-terminated polyether. In the desired mixture, the thixotropic component is formulated from a thixotropic hydroxyl-terminated polyether sold by Castall Inc., East Weymouth, Mass., under the designation U-2630 and a non-thixotropic hydroxyl-terminated polyether sold by Castall Inc., under the description U-2420. The mixture in the ratio of 2.5 parts of U-2630 to 1 part of U-2420 and an appropriate quantity of accelerator is available as a result of this invention from Castall Inc., under the designation UX 7778. The accelerator promotes curing, and the quantity of the accelerator is selected and adjusted so that the composition does not cure in the applicator or during the initial time period immediately following application, but will cure at an elevated temperature of about 130° to 170° Fahrenheit in between about 7 to 20 minutes.

The pre-mixed thixotropic component, non-thixotropic component and accelerator are mixed in the applicator with an isocyanate cross-linking agent. The cross-linking agent is an ester polyol. Both the pre-mixed materials and the cross-linking agent are separately fed to a mixing chamber and nozzle of the applicator. The resulting composition flows or is extruded as a stream from the applicator nozzle onto the outer surface of a glove in a pattern controlled by movement of the nozzle and flow of the composition. The stream is moved and controlled to form one or more non-intersecting strips on the underlying surface of the glove; specifically on the finger stalls and the palm portion of the glove. In the preferred embodiment, the polyurethane coating is applied so the cured strip or strips of the polyurethane composition has or have a height of about 1/32 inch above the glove surface and a width of about 1/16 inch.

The composition of the strips is a combination of a polyurethane thixotropic resin and a polyurethane non-thixotropic resin. The different properties of both of these resins are utilized to form the desired coating. The composition upon application to the outer surface of the glove, has the characteristics of a gel having dimensional stability; i.e., it has and maintains thixotropic properties. On the other hand, the non-thixotropic resin modifies the thixotropic properties so the composition does not entirely remain on the surface of the glove, but wets the contacted surface of the glove and in part permeates into the adjacent part of the glove material. When the glove is constructed with yarn, for example, the resin mixture partially permeates the yarn for adhesion upon curing, but is sufficiently thixotropic to not strike through to the inside of the glove. Deep penetration of the coating would lock the stitches of the glove fabric together and stiffen the glove. There is an initial time period that is needed in the process of manufacture to allow for the permeation to occur; typically about 15 to 60 seconds at ambient temperature with the composition referred to on a glove knitted of a composite synthetic yarn but varying, of course, with the permeability of the material being coated.

Following the initial time period, the composition is cured at a temperature between about 130° to 170° F., preferably 130° to 150° F., for about 7 to 20 minutes, preferably 15 minutes. The time period can be adjusted by controlling the amount of accelerator, and the curing time can be selected within the general range indicated to provide a time advantageous to the manufacturing process.

Because the strip or strips of polyurethane have significant height due to the thixotropic nature of the composition, intersections would result in isolated locations of undue height and are therefore avoided. However, for ease and speed of application of the material, it is desirable to stop and start the flow from the applicator as infrequently as possible, while yet applying a good pattern that enhances gripping ability. A preferred pattern is shown in FIG. 1 of the drawings, where it can be seen that the five finger stalls 16, 17, 18, 19 and 20 and an adjacent portion of the palm area 22 are coated with only three separate sinuous strips 24, 25, 26 of polyurethane composition that do not intersect at any place. The cured polyurethane coating adhered to the glove offers the positive features of grip and slip-resistance. The height and width of the bead are important to flexibility and the desired slip-resistance. If the bead is too shallow it will not resist wear and if it is too narrow it will not cover enough area to provide the desired slip-resistant feature. If the bead is too high an object gripped will contact only the strip or bead itself and the glove will not grip as effectively and it will not provide the necessary feel to the wearer. It will also stiffen the glove unnecessarily. The preferred pattern provides predominantly lateral lines across the finger stalls with connecting loops only to the extreme sides of the finger stalls, so in use the wearer need not buckle coating strips extending along central areas of the finger stalls when the fingers are bent. The cured polyurethane coating adhered to the glove is cut-resistant, flexible, soft and has a high coefficient of friction against relatively dry surfaces.

The coating and curing process is accomplished by moving gloves on rigid forms 27 along a path of travel through successive operations, the path preferably being in the form of a loop. Initially, a glove to be coated is stretched over a flat form 27 so the glove is held in a predetermined shape, such as shown in FIG. 1. The form is placed in a predetermined position at the coating apparatus and the strips or beads 24-26 of polyurethane are applied from the moving nozzle in the desired pattern, such as that shown in FIG. 1. The coating apparatus is commercially available, e.g., Asmtek Model A-303A X-Y-Z robotic table and a Sealant Equipment Company Model SEE-FLO 10 mixes and dispenses automatically the polyurethane and applies it in a programmed pattern when a glove is positioned at the robotic table indicated diagrammatically at 28. In the preferred method, two forms with gloves are positioned at the coating apparatus with each index of a conveyor from which the forms extend laterally and horizontally on support rods 28. The presence of a form with a glove over the form is sensed and the coating apparatus automatically moves in the desired path and dispenses the urethane in the desired pattern, first on one of the gloves and then the next, thereafter returning to a home location from which to start the next cycle. The two coated gloves are then indexed by the conveyor to and through a heating station where the gloves pass beneath heaters, such as electric heat lamps, where the coatings are cured. The gloves are then indexed to a handling station where they are removed from the forms and new gloves are placed on the form for indexing to the coating apparatus; or where the forms are rotated 180° to expose the opposite side of the gloves to the coating applicator, in which case the same gloves are again placed at the coating apparatus for the application of a polyurethane pattern on the opposite side of the glove. The distance from the coating apparatus to the heaters, the length of the heating station, and the speed of the conveyor control the initial time period for the coating to partially permeate the glove surface prior to the application of heat, and the subsequent time period for heating during which the coating is cured. The heat lamps are arranged along the conveying path and can be individually operated to also control the time period during which heat is applied. Where desired, the surface of the urethane strips can be texturized prior to or during the curing process, as by pressing a pattern into the surface of the strips with a screen or knurled tool, or abrasive particles can be applied to the surface of the of the strips. Such texturizing tends to improve performance of the gloves when used under wet or moist conditions.

The glove or other hand covering, e.g., a mitten, can be constructed of many materials and typically they will be somewhat permeable to the coating. The particular gloves primarily contemplated for coating are made of woven or knitted yarn. The preferred material is a cut-resistant yarn and preferably the gloves are knit. The yarn preferably has a core and a covering. The core includes a strand of synthetic fibers or fibers and/or one or more strands of flexible wire, preferably annealed stainless steel. The covering includes two or more wrapping strands, preferably of synthetic fibers. Preferably, at least one of the wrapping strands and a core strand are a high-strength synthetic fiber.

In one preferred embodiment of the present invention the glove 10 is knitted from a cut-resistant yarn 30 that comprises a core 32 and a covering 34. The core has two annealed stainless steel wires 35, 36 each 0.003 inch in diameter and a high-strength synthetic fiber 38, specifically high-strength stretched polyethylene fiber having a denier of 650. The covering includes three wrapping strands 40, 42, 44. A first wrapping strand 40 is of high strength synthetic fiber wrapped about the core in a first direction, specifically high strength aramid fiber having a denier of 400. A second wrapping strand 42 is of synthetic fiber wrapped about the first in an opposite direction, specifically high strength stretched polyethylene fiber having a denier of 650. The third wrapping strand 44 is of a synthetic fiber, specifically polyester having a denier of 440 and is wrapped about the second strand in an opposite direction.

In the second embodiment of the present invention, the preferred cut-resistant yarn 46 comprises a core 48 and a covering 50 about the core. The core has an annealed stainless steel wire 52 having a diameter of 0.003 inch and a high strength synthetic fiber 54, specifically high strength stretched polyethylene fiber having a denier of 650. The covering has a first wrapping 56 of a high strength synthetic fiber, specifically high strength stretched polyethylene fiber having a denier of 650, and a second wrapping 58 of a synthetic fiber, specifically polyester having a denier of 1320.

The high strength synthetic fibers can be selected from the group consisting of high strength aramid fiber, high strength stretched polyethylene fiber, and high strength liquid crystal polymer fiber. Nylon can be substituted for polyester.

EXAMPLE I

A cut-resistant glove having a patterned slip-resistant polyurethane coating adhered to the outer surface of the glove was prepared. The glove was constructed of cut-resistant yarn having a core and a wrapping. The core included two stainless steel wires, each having a diameter of 0.003 inch and a high strength stretched polyethylene strand having a denier of 650, sold under the name Spectra. The wrapping consisted of a first wrapping strand of high strength aramid fiber having a denier of 400, sold under the name Kevlar, a second wrapping strand of high strength stretched polyethylene fiber having a denier of 650, Spectra, and a third wrapping strand of polyester having a denier of 440. The wrappings are each wrapped in opposite directions.

A thixotropic component, Castall U-2630, and a non-thixotropic component, Castall U-2420, were pre-mixed in a ratio of 2.5 to 1, with an adjusted amount of accelerator. The mixture is now available from Castall Inc. as UX-7778. The mixture was supplied to a mixing chamber of an applicator. A cross-linking agent, ester polyol, was also provided to the mixing chamber. A composition was formed in the mixing chamber which was extruded from a nozzle onto the outer surface of a glove below the nozzle. The nozzle was moved horizontally above the glove under control of a program that moved the nozzle in a predetermined path and controlled the flow of mixture from the mixing chamber. An Asymtek Model A-303A X-Y-Z robotic table with a Sealant Equipment Company Model SEE-FLO 10 for mixing and dispensing system was used. The composition was applied in the form of non-intersecting strips approximately 1/16 inch wide and that extended approximately 1/32 inch above the outer surface of the glove.

Approximately 30 seconds was allowed after application for the mixture to wet the outer surface of the glove at ambient room temperature. The glove was then passed below heat lamps which raised the temperature of the strips to between 130° F. to 170° F. for approximately 15 minutes. The strips cured during this time period into a cured polyurethane coating which adhered to the yarn of the glove. This glove had the desired qualities of high slip-resistance, gripability, cut-resistance, abrasion resistance, flexibility and softness. The polyurethane cured at an acceptable rate and at a sufficiently low enough temperature to make the process advantageous for manufacturing and suitable for cut-resistant yarns. In particular it was suitable for yarns that include Spectra, which cannot endure high temperatures.

EXAMPLE II

In this example a different glove construction was utilized. This glove had yarn with a core and a wrapping. The core included one stainless steel wire of a 0.003 inch diameter and a high strength stretched polyethylene fiber having a denier of 650 (Spectra). The wrapping comprised two wrapping strands, a first wrapping strand of a high strength stretched polyethylene having a denier of 650 (Spectra), and a second wrapping strand of polyester having a denier of 1320. The above described coating was applied to this glove in the manner set forth in Example I, resulting in a glove having the desired qualities of high slip-resistance, gripability, cut-resistance, abrasion resistance, flexibility and softness.

From the foregoing description of preferred embodiments of the invention it will be apparent that the advantages of the invention heretofore enumerated and others have been accomplished in that there have been provided improved slip-resistant gloves made by adhering a polyurethane coating to the outer surface of the gloves resulting in superior qualities. While preferred embodiments of the invention have been described in considerable detail, various modifications or alterations may be made therein without departing from the spirit or scope of the invention set forth in the appended claims.

We claim:

1. A glove having a patterned slip-resistant polyurethane coating adhered to an outer surface of the glove, the coating having a substantial height and a substantial width, and being partially absorbed into and predominantly extending from the outer surface of the glove, to give the glove slip-resistance and grip properties, the coating comprising a cured polyurethane composition formed from (a) a pre-mixed thixotropic component and an accelerator, and (b) a cross-linking agent.

2. A glove according to claim 1 wherein the thixotropic polyurethane component is a mixture of a thixotropic and a non-thixotropic polyurethane component, pre-mixed in a ratio of between about 3 to 1 and 2 to 1 respectively.

3. A glove according to claim 2 wherein the ratio is about 2.5 to 1.

4. A glove according to claim 1 wherein the coating is in the form of one or more non-intersecting strips.

5. A glove having a patterned slip-resistant polyurethane coating adhered to an outer surface of the glove, the coating having a substantial height and a substantial width to give the glove slip-resistance and grip properties, the coating comprising a cured polyurethane composition formed from (a) a pre-mixed thixotropic component, a non-thixotropic component, and an accelerator, and (b) a cross-linking agent.

6. A glove according to claim 4 wherein the strips are approximately 1/32 inch high and 1/16 inch wide.

7. A glove according to claim 1 wherein the thixotropic compound is a hydroxyl terminated polyether and the cross-linking agent is an ester polyol.

8. A glove according to claims 1, 2, 3, 4, 5, 6 or 7 at least in part made of yarn, wherein the coating is adhered to the yarn and the yarn comprises at least one wire strand and synthetic fiber covering the wire strand.

9. A glove according to claim 8 wherein the yarn comprises a core and a covering that includes a first and a second wrapping of synthetic fiber strands each wrapped about the core in an opposite direction.

10. A glove according to claim 9 wherein one of said core and covering strands includes a high strength synthetic fiber.

11. A glove according to claim 10 wherein the high strength synthetic fiber is selected from the group consisting of high strength stretched polethylene fiber, high strength aramid fiber and high strength liquid crystal polymer fiber.

12. A method of manufacturing a glove having a patterned slip-resistant polyurethane coating adhered to an outer surface of the glove comprising the steps of:
 (1) selecting a glove;
 (2) providing a pre-mixed composition of a thixotropic polyurethane component, a non-thixotropic polyurethane component and an accelerator;
 (3) providing a cross linking agent for the polyurethane components;
 (4) mixing the composition and agent;
 (5) flowing a stream of the mixture onto a surface of the glove in a controlled pattern and thereby forming localized raised portions on the surface of the glove; and
 (6) curing the mixture to form a glove having a patterned coating adhered to the glove.

13. A method as set forth in claim 12 wherein the curing step includes an initial time period after the mixture is applied to the glove and during which the mixture is maintained at ambient temperature and in part wets the glove surface and a subsequent time period during which the mixture is heated above ambient temperature.

14. A method as set forth in claim 13 wherein the initial time period is between about 15 and 60 seconds and the subsequent time period is between about 7 and 20 minutes and the mixture is heated to a temperature of between about 130° to 170° F.

15. A method according to claims 12, 13, or 14 wherein the thixotropic and non-thixotropic components that are mixed are both a hydroxyl terminated polyether, and the cross-linking agent is an ester polyol.

16. A method as set forth in claims 12, 13 or 14 wherein the glove is comprised in part of a cut-resistant yarn having at least one wire strand and synthetic fiber covering the wire strand.

17. A method as set forth in claims 12, 13, or 14 wherein the stream is directed from an outlet that is moved relative to the glove and the pattern is applied in the form of elongated non-intersecting strips of the mixture.

18. A method of manufacturing a glove having a patterned slip-resistant polyurethane coating comprising the steps of:
 (1) selecting a glove;
 (2) providing a pre-mixed composition of a thixotropic polyurethane component, a non-thixotropic polyurethane component and an accelerator; each of the thixotropic and non-thixotropic components being a hydroxyl terminated polyether;
 (3) providing an ester polyol cross-linking agent for said polyurethane components;
 (4) mixing the composition and agent;
 (5) applying a stream of the mixture onto a surface of the glove in a controlled pattern in a manner to form localized strips on the surface of the glove; and
 (6) curing the applied mixture to from a glove having a patterned coating of polyurethane adhered to the glove, the curing step including an initial time period during which the mixture is maintained at ambient temperature and in part wets the glove surface and a subsequent time period of between about 7 and 20 minutes during which the mixture is heated to a temperature of between about 130° C. to 170° F.

19. A out-resistant glove having a patterned slip-resistant polyurethane coating adhered to the outer surface of the glove comprising:
 a cut-resistant yarn, the yarn comprising a core of two strands of a wire and a strand of high strength synthetic fiber; and a wrapping, the wrapping comprising a first wrapping strand of a high strength synthetic fiber wrapped about the core in a first direction and a second wrapping strand of a high strength synthetic fiber wrapped about the first wrapping strand in an opposite direction from the first wrapping strand and a third wrapping strand of a synthetic fiber wrapped about the second wrapping strand; and the coating is in the form of non-intersecting strips, the strips being about 1/32 inch high and about 1/16 inch wide to give the glove slip-resistance and grip properties, the coating comprising a cured polyurethane composition formed from (a) a pre-mixed thixotropic component, a non-thixotropic component, and an accelerator, and (b) a cross-linking agent, the coating in part permeating the glove surface for adhesion while essentially retaining dimensional stability.

20. A glove according to claim 19 wherein the wires are annealed stainless steel having a diameter of 0.003 inch, the core strand is high strength stretched polyethylene fiber having a denier of 650, the first wrapping strand is high strength aramid fiber having a denier of 400, the second wrapping strand is high strength stretched polyethylene fiber having a denier of 650 and the third wrapping strand of polyester having a denier of 440.

21. A cut-resistant glove having a patterned slip-resistant polyurethane coating adhered to the outer surface of the glove comprising:
a cut-resistant yarn, the yarn comprising a core having a wire strand and a high strength synthetic fiber; and a wrapping, the wrapping comprising a high strength synthetic fiber wrapped in a first direction about the core and a second wrapping strand wrapped about the first wrapping strand in an opposite direction from the first wrapping strand; and the coating in the form of non-intersecting strips, the strips being about 1/32 inch high and about 1/16 inch wide to give the glove slip-resistance and grip properties, the coating comprising a cured polyurethane composition formed from (a) a pre-mixed thixotropic component, a non-thixotropic component, and an accelerator, and (b) a cross-linking agent, the coating in part permeating the glove surface for adhesion while essentially retaining dimensional stability.

22. The cut-resistant glove according to claim 21 wherein the core high strength synthetic fiber is a high strength stretched polyethylene fiber having a denier of 650 and the wire is a 0.003 inch diameter stainless steel; the first wrapping strand is high strength stretched polyethylene fiber having a denier of 650 and the second wrapping strand is a polyester fiber having denier of 1320.

23. The cut-resistant glove according to claims 19 or 21 wherein the thixotropic and non-thixotropic polyurethane components are a hydroxy terminated polyol and the cross-linking agent is an ester polyol.

24. A glove according to claim 5 wherein the thixotropic and non-thixotropic components are a hydroxyl terminated polyether and the cross-linking agent is an ester polyol.

25. A glove according to claim 4 wherein the coating is predominantly lateral lines across the finger stalls with connecting loops only to the extreme sides of the finger stalls.

26. A method of manufacturing a glove having a patterned slip-resistant polyurethane coating adhered to an outer surface of the glove comprising the steps of:
(1) selecting a glove;
(2) providing a pre-mixed composition of a thixotropic polyurethane component, a non-thixotropic polyurethane component and an accelerator;
(3) providing a cross linking agent for the polyurethane components;
(4) mixing the composition and agent;
(5) applying the mixture onto a surface of the glove in a pattern and forming localized raised portions of the mixture on the surface of the glove; and
(6) curing the mixture to form a glove having a patterned coating adhered to the glove.

* * * * *